US010345503B2

(12) United States Patent
Takata et al.

(10) Patent No.: US 10,345,503 B2
(45) Date of Patent: Jul. 9, 2019

(54) DISPLAY DEVICE

(71) Applicant: Panasonic Intellectual Property Management Co., Ltd., Osaka (JP)

(72) Inventors: Kazumasa Takata, Osaka (JP); Kenji Takamoto, Osaka (JP); Wahei Agemizu, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/730,703

(22) Filed: Oct. 11, 2017

(65) Prior Publication Data

US 2018/0136386 A1 May 17, 2018

(30) Foreign Application Priority Data

Nov. 17, 2016 (JP) ................. 2016-223678

(51) Int. Cl.
*F21V 8/00* (2006.01)
*G02F 1/01* (2006.01)
*G06F 3/041* (2006.01)

(52) U.S. Cl.
CPC .......... *G02B 6/0028* (2013.01); *G02B 6/003* (2013.01); *G02B 6/0031* (2013.01); *G02B 6/0068* (2013.01); *G02F 1/0105* (2013.01); *G06F 3/0412* (2013.01)

(58) Field of Classification Search
None
See application file for complete search history.

(56) References Cited

U.S. PATENT DOCUMENTS 4,965,950 A * 10/1990 Yamada ............... B60Q 1/56
362/613
5,555,160 A * 9/1996 Tawara ............... G02B 6/0046
349/62
5,575,549 A * 11/1996 Ishikawa ............. G02B 6/0025
362/330
6,002,079 A * 12/1999 Shin ....................... A63J 17/00
84/464 R
(Continued)

FOREIGN PATENT DOCUMENTS

JP 2006-075362 3/2006
JP 2006-184881 7/2006
(Continued)

*Primary Examiner* — Elmito Breval
(74) *Attorney, Agent, or Firm* — Wenderoth, Lind & Ponack, L.L.P.

(57) ABSTRACT

A display device includes a light guide plate, and light sources allowing light to be incident on a first side surface and a second side surface of the light guide plate. First incidental side surface light from the first light source is reflected to an upper surface side by first reflection parts formed on a bottom surface to display a first pattern, and second incidental side surface light from the second light source is reflected to the upper surface side by second reflection parts formed on the bottom surface to display a second pattern. Slopes are provided at parts of the first side surface and the second side surface of the light guide plate, and light reflected on a facing reflection surface and propagating in the light guide plate again is reduced by the slopes.

13 Claims, 18 Drawing Sheets

(56) References Cited

U.S. PATENT DOCUMENTS

| | | | |
|---|---|---|---|
| 6,966,684 B2* | 11/2005 | Sommers | G02B 6/0036 |
| | | | 362/559 |
| 6,971,758 B2* | 12/2005 | Inui | G02B 6/0018 |
| | | | 362/23.01 |
| 2006/0083476 A1 | 4/2006 | Winkler | |
| 2008/0186736 A1 | 8/2008 | Rinko | |
| 2012/0287669 A1 | 11/2012 | Montgomery et al. | |
| 2015/0293296 A1* | 10/2015 | Kikuchi | G02B 6/0051 |
| | | | 362/606 |
| 2017/0097614 A1* | 4/2017 | Kang | G02B 6/0068 |

FOREIGN PATENT DOCUMENTS

| | | |
|---|---|---|
| JP | 2013-517590 | 5/2013 |
| JP | 2015-043327 | 3/2015 |

\* cited by examiner

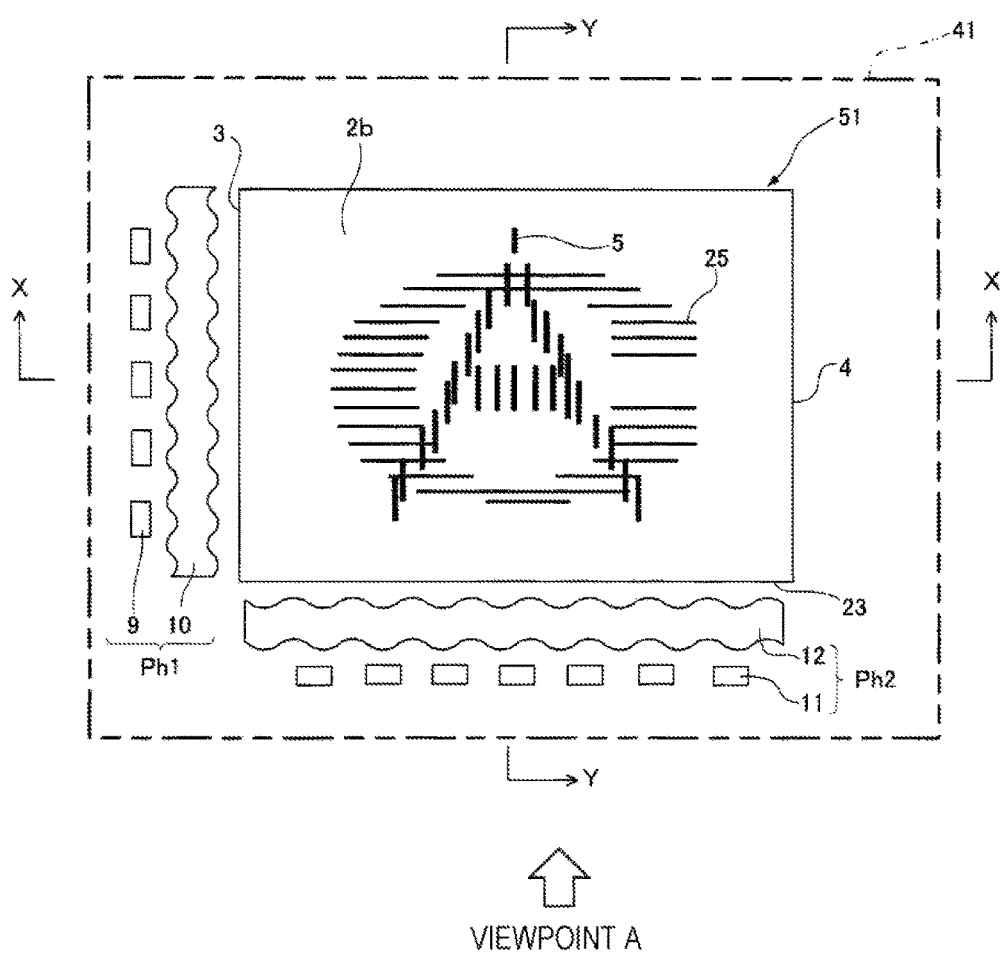

FIG. 17A
RELATED ART
FIG. 17B
RELATED ART
FIG. 17C
RELATED ART
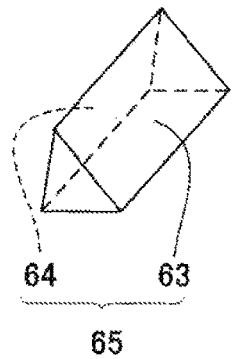
FIG. 18A
RELATED ART
FIG. 18B
RELATED ART
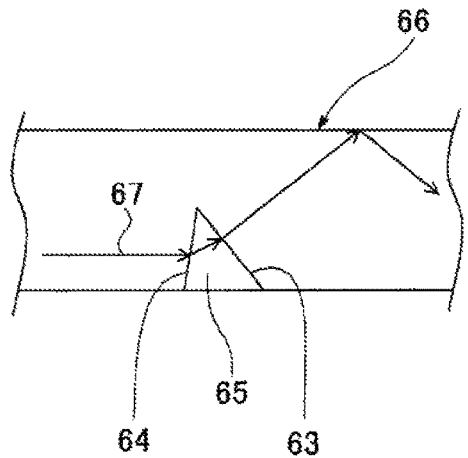
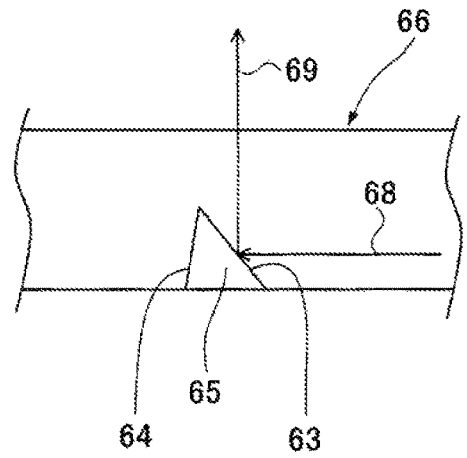

FIG. 19
RELATED ART
(a)
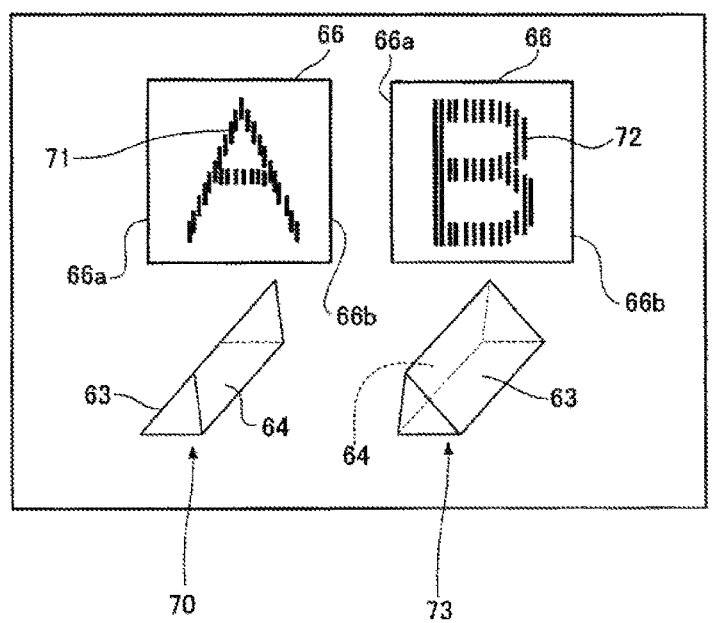
(b)
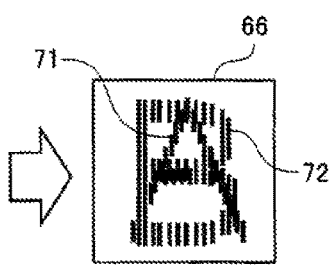

DISPLAY DEVICE

TECHNICAL FIELD

The technical field relates to a display device that switches and displays plural display information on one display area of one light guide plate.

BACKGROUND

A common display device using a light guide plate has an optical display structure in which light emitted from light-emitting devices such as light-emitting diodes is allowed to be incident on the inside of the light guide plate from a side surface in a bottom surface, an upper surface and the side surface of the light guide plate. The incident light is reflected in the inside of the light guide plate efficiently and is emitted from a display area on the upper surface of the light guide plate. On the bottom surface of the light guide plate, a large number of reflection parts having fine protruding shapes are formed for reflecting or refracting outgoing light efficiently.

When the reflection part having the protruding shape is a conical reflection part 61 or a hemispheric reflection part 62 which protrudes from the bottom surface to the inside of the light guide plate as shown in FIGS. 17A and 17B, light incident from all directions is reflected as outgoing light, therefore, only one pattern is capable of being displayed on one display area of one light guide plate.

Accordingly, when plural patterns are desirable to be displayed on one display area as in game machines such as a pachinko machine or a pachinko slot machine, it is necessary to stack plural number of common light guide plates in which display information is recorded by the protruding shapes of reflection parts 61 or 62. When plural light guide plates are necessary, costs are increased. As space for setting plural light guide plates is also necessary, there is a problem that an apparatus will be increased in size.

In order to solve this problem, a disclosure in which a reflection part 65 having a gentle slope 63 and a steep slope 64 is adopted as the shape of protruding shaped reflection parts as shown in FIG. 17C is disclosed in JP-A-2006-75362 (Patent Literature 1). Behavior of incident light onto the reflection part 65 will be explained with reference to FIGS. 18A and 18B.

On a bottom surface of a light guide plate 66, the reflection part 65 is formed by a method such as cutting a cross section. The reflection part 65 includes the gentle slope 63 and the steep slope 64.

FIG. 18A shows behavior of a light 67 that is incident on the light guide plate 66 from a side where the steep slope 64 exists. The light 67 is transmitted after being refracted on the steep slope 64 and the gentle slope 63, propagating inside the light guide plate 66 again. Accordingly, light incident from the steep slope 64 side is not easily outputted from the light guide plate 66, FIG. 18B shows behavior of a light 68 that is incident on the light guide plate 66 from a side where the gentle slope 63 exists. The light 68 is totally reflected on the gentle slope 63 and is outputted from an upper surface of the light guide plate 66 as alight 69. Accordingly, light incident from the gentle slope 63 side is easily outputted from the light guide plate 66.

Accordingly, a display device in which two patterns "A" and "B" are recorded on one display area of the light guide plate by an aggregation of such prism shapes will be explained with reference to FIG. 19 and FIGS. 20A, 20B.

Part (a) of FIG. 19 shows a state where the pattern "A" represented by a symbol 71 is recorded by an aggregation of reflection parts 70 on the single light guide plate 66 and the pattern "B" represented by a symbol 72 is recorded by an aggregation of reflection parts 73 on the same display area as the display area where the pattern "A" is displayed.

In the reflection part 70 including the gentle slope 63 and the steep slope 64, the gentle slope 63 faces a side surface 66a of the light guide plate 66. In the reflection part 73 including the gentle slope 63 and the steep slope 64, the gentle slope 63 faces a side surface 66b of the light guide plate 66.

Though two light guide plates 66 are shown side by side in (a) of FIG. 19, they are actually a single light guide plate 66, and two patterns represented by symbols 71 and 72 are recorded in one display area of the light guide plate 66 as shown in (b) of FIG. 19.

When the pattern "A" is displayed, approximately parallel light from light sources 74 is allowed to be incident on the inside of the light guide plate 66 from the side surface 66a as shown in FIG. 20A. When a light 75 from the light sources 74 is reflected on the gentle surface 63 of each reflection part 70, the pattern "A" is displayed. The light 75 is incident on the steep slope 64 of the reflection part 73 and is transmitted after being refracted on the gentle slope 63 of the reflection part 73, propagating inside the light guide plate 66 again, therefore, the pattern "B" is not displayed.

When the pattern "B" is displayed, approximately parallel light from light sources 76 is allowed to be incident on the inside of the light guide plate 66 from the side surface 66b as shown in FIG. 20B. When a light 77 from the light sources 76 is reflected on the gentle surface 63 of each reflection part 73, the pattern "B" is displayed. The light 77 is incident on the steep slope 64 of the reflection part 70 and is transmitted after being refracted on the gentle slope 63 of the reflection part 70, propagating inside the light guide plate 66 again, therefore, the pattern "A" is not displayed.

As the light is incident on the light guide plate 66 from the side surface 66a or 66b in opposite directions, the patterns "A" and "B" can be displayed while switching between these patterns.

FIGS. 21A and 21B show a related-art display device in which directions from which light is incident are not opposite directions as shown in FIG. 19 and FIGS. 20A, 20B but are orthogonal directions. In this display device, lengths of sides from which light is incident differ from each other. Also in the display device, patterns to be displayed are switched according to directions of light incident on the light guide plate 66 by changing the direction of the gentle slope 63 of the reflection part in the same manner explained in FIGS. 20A and 20B. For example, two kinds of reflection parts are arranged so that longitudinal directions are orthogonal to each other, and two kinds of light sources 74 and 78 are arranged with respect to two sides respectively so that directions of light incident from the light sources are orthogonal to longitudinal directions of the two kinds of reflection parts. The pattern "A" represented by the symbol 71 is displayed by the light 75 shown in FIG. 21A, and a pattern "C" represented by a symbol 80 is displayed by a light 79 which is approximately perpendicular to the light 75 as shown in FIG. 21B.

SUMMARY

However, in the structure shown in FIGS. 20A and 20B, part of the light propagating inside the light guide plate 66 and reaching the side surface 66b is reflected on the side surface 66b and is incident on the gentle surface 63 of the reflection part 73 when displaying the pattern "A" as shown in FIG. 22. Accordingly, there is a problem that the pattern "B" which is not desirable to be displayed is lightly displayed during display of the pattern "A". Furthermore, part of light propagating inside the light guide plate 66 and reaches the side surface 66a is reflected on the side surface 66a and is incident on the gentle slope 63 of the reflection part 70 when displaying the pattern "B". Accordingly, there is a problem that the pattern "A" which is not desirable to be displayed is lightly displayed during display of the pattern "B".

FIG. 22 shows light being guided inside the light guide plate 66 with a cross section of the light guide plate 66. The light 75 that is guided during the display of the pattern "A" proceeds while totally reflecting on upper and lower surfaces of the light guide plate 66 and reaches the side surface 66b facing the incident side surface. On the side surface 66b, the light 75 is divided into a light 75a that is refracted and transmitted and a light 75b that is Fresnel-reflected.

As commonly known, a reflectance R obtained when light is vertically incident from a material with a refractive index n0 to a material with a refractive index n1 is represented by the following (formula 1).

$$R=(n0-n1)^2/(n0+n1)^2 \quad \text{(formula 1)}$$

As the light guide plate, a transparent resin such as polycarbonate is generally used. Transparent resins have various refractive indexes according to materials, and resins with refractive indexes of approximately 1.5 are often used. A reflectance obtained when light is incident on an air layer with a refractive index 1.0 from the transparent resin with the refractive index 1.5 is represented by (formula 1) as follows:

$$R=(1.5-1.0)^2/(1.5+1.0)^2=0.04$$

A reflected light of approximately 4% is generated. The reflected light will be an incident light of another pattern "B". As a result, the unnecessary pattern "B" is displayed.

Also in the display device in which directions in which light is incident are orthogonal directions as shown in FIGS. 21A and 21B, there are the following problems.

In this case, a shape of the side surface 66c on which light is incident from the light sources 78 may be deformed as shown by solid lines in FIG. 23 due to so-called residual stress of processing such as molding at the time of manufacturing or due to a force given from the outside. In a case where the shape of the light guide plate 66 is a rectangular shape, a long side is largely deformed as compared with a short side due to the molding. As a result, when the shape of the side surface 66c is deformed, a ratio in which light is incident on the side surface 66c is partially reduced, and a phenomenon in which the pattern becomes partially lighted occurs at a place where an incident light amount is small in a display state of the pattern "C". Specifically, outgoing light is reduced at a portion parallel to a short side in the center of the long side of the light guide plate 66. Alternatively, outgoing light is reduced at a portion parallel to the short side in both end portions of the long side.

SUMMARY OF THE INVENTION

The present disclosure has been made in view of the above problems and an object thereof is to provide a display device capable of beautifully displaying the pattern desired to be displayed in the display device that displays plural patterns while switching between these patterns.

A display device according to the present disclosure includes a light guide plate in which a first side surface and a second side surface face each other, a bottom surface and an upper surface facing each other are formed between the first side surface and the second side surface, and light incident on the inside from one of the first side surface and the second side surface propagates toward the other side, a first light source unit allowing light to be incident on the first side surface of the light guide plate, and a second light source unit allowing light to be incident on the second side surface of the light guide plate, in which light incident on the first side surface of the light guide plate from the first light source unit is reflected to an upper surface side by first reflection parts formed on the bottom surface of the light guide plate and is emitted to the outside of the light guide plate to thereby display a first pattern, and light incident on the second side surface of the light guide plate from the second light source unit is reflected to the upper surface side by second reflection parts formed on the bottom surface of the light guide plate and is emitted to the outside of the light guide plate to thereby display a second pattern, and in which a slope is provided at part of at least one of the first side surface and the second side surface of the light guide plate.

A display device also according to the present disclosure includes a light guide plate in which a first side surface and a second side surface adjacent to the first side surface are orthogonal to each other, a bottom surface and an upper surface facing each other are formed so as to form the first side surface and the second side surface, light incident on the inside from the first and second side surfaces propagates, a first light source unit allowing light to be incident on the first side surface in a short-length direction in the first and second side surfaces and a second light source unit allowing light to be incident on the second side surface in a longitudinal direction in the first and second side surfaces, in which light incident on the first side surface of the light guide plate from the first light source unit is reflected to an upper surface side by first reflection parts formed on the bottom surface of the light guide plate and is emitted to the outside of the light guide plate to thereby display a first pattern, and light incident on the second side surface of the light guide plate from the second light source unit is reflected to the upper surface side by second reflection parts formed on the bottom surface of the light guide plate and is emitted to the outside of the light guide plate to thereby display a second pattern, and in which, when a thickness of the second side surface of the light guide plate is "T", a length of the second light source unit in a thickness direction of the light guide plate is "t_LS" and a distance between a center of the thickness of the second side surface of the light guide plate and a center of the length of the second light source unit in the thickness direction of the light guide plate is $\Delta C$, T>t_LS>$\Delta C$ is satisfied.

In the display device according to the present disclosure, part of light incident on the light guide plate from the first light sources is reflected on the first reflection parts formed in the light guide plate to display the first pattern on the upper surface of the light guide plate. Part of light incident on the light guide plate from the first light sources reaches a light entrance surface opposite to the first light sources of the light guide plate, however, most of the reached light is reflected to the outside of the light guide plate by the slope formed in the opposite light entrance surface. Therefore, light reflected on the opposite reflection surface and propagating in the light guide plate again is reduced. Accordingly, the phenomenon in which the unnecessary second pattern is displayed can be suppressed.

Also in the display device according to the present disclosure, positional deviation is suppressed between the light guide plate and the light entrance, even when the light guide plate is deformed. Accordingly, the phenomenon in which intensities of light propagating inside the light guide plate varies according to light entrance positions can be suppressed even when proportions of light entering the light guide plate is changed according to deformed positions. Accordingly, the phenomenon in which light-emitting intensities of the pattern to be displayed varies according to display locations can be minimized and a beautiful display with a uniform light-emitting intensity can be realized.

BRIEF DESCRIPTION OF THE DRAWINGS

FIG. 14 of a plan view showing a display device according to Embodiment 3 of the present disclosure;

FIGS. 17A to 17C are perspective views showing protruding part shapes formed as reflection parts in related-art light guide plates;

FIGS. 18A and 18B are views for explaining behavior of light in a related-art light guide plate in which a protruding part shape is a prism shape;

FIG. 19 is a view for explaining operation principles of a light guide plate in which two patterns of "A" and "B" are recorded in a display area by an aggregation of prism-shaped reflection parts and display area state;

DESCRIPTION OF EMBODIMENTS

Hereinafter, respective embodiments of the present disclosure will be explained with reference to the drawings.

Embodiment 1

FIGS. 1A, 1B, FIGS. 2A, 2B and FIG. 3 to FIG. 11 show embodiments of the present disclosure.

Figure 1A:
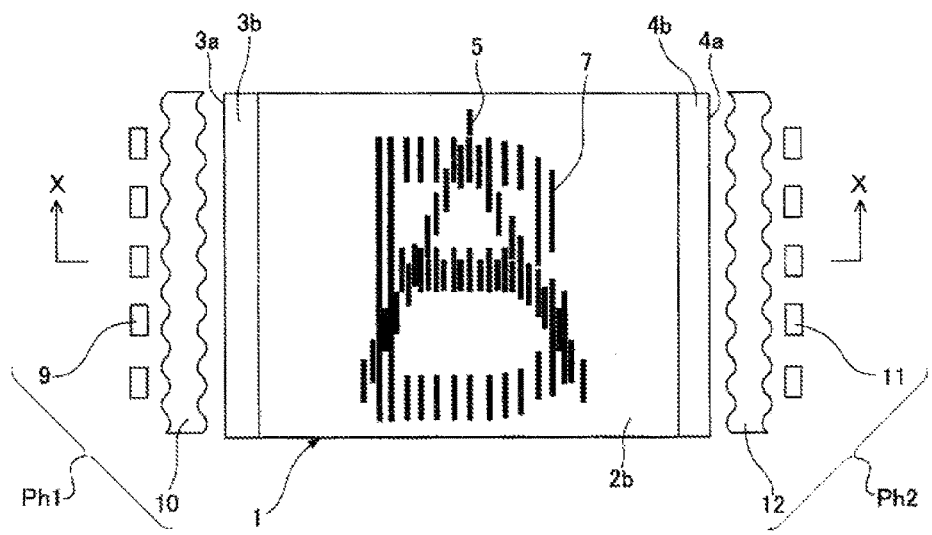
FIG. 1A is a plan view of a display device according to Example 1 of Embodiment 1 of the present disclosure and FIG. 1B is a cross-sectional view taken along X-X of FIG. 1A.
Figure 1B:
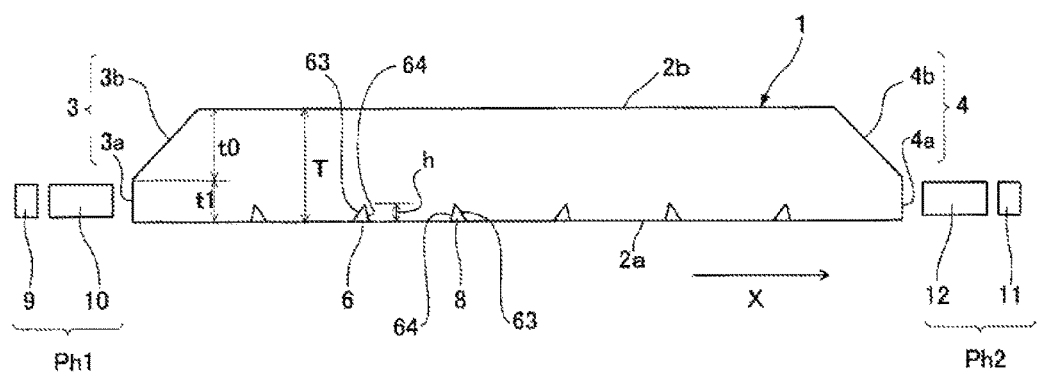

FIG. 1A shows a front view of a display device according to the present disclosure and FIG. 1B shows a cross-sectional view taken along X-X of FIG. 1A.

In a first side surface 3 and a second side surface 4 which face each other in an outer peripheral surface between a bottom surface 2a and an upper surface 2b of a flat light guide plate 1, the first side surface 3 includes a first incident surface 3a a lower end of which is connected to an outer periphery of the bottom surface 2a and which vertically rises and a first slope 3b which is positioned between an outer periphery of the upper surface 2b of the light guide plate 1 and an upper end of the first incident surface 3a and which is inclined toward the inside of the light guide plate 1. The first slope 3b is formed in the entire first side surface 3 in a lengthwise direction.

The second side surface 4 includes a second incident surface 4a a lower end of which is connected to the outer periphery of the bottom surface 2a and which vertically rises and a second slope 4b which is positioned between the outer periphery of the upper surface 2b of the light guide plate 1 and an upper end of the second incident surface 4a and which is inclined toward the inside of the light guide plate 1 in the same manner as the first side surface 3. The second slope 4b is formed on the entire second side surface 4 in a lengthwise direction.

On the bottom surface 2a of the light guide plate 1, a large number of first reflection parts 6 are engraved as protruding parts protruding to the inside so that a pattern 5 of "A" is displayed as a whole seen from the upper surface 2b. Furthermore, a large number of second reflection parts 8 are engraved as protruding parts protruding to the inside in the same display range as the pattern 5 so that a pattern 7 of "B" is displayed as a whole seen from the upper surface 2b.

Light is incident on the first incident surface 3a of the light guide plate 1 from a first light source unit ph1. The first light source unit ph1 is formed by light sources 9 such as light-emitting diodes and a lens 10. Light is incident on the second incident surface 4a of the light guide plate 1 from a second light source unit ph2. The second light source unit ph2 is formed by light sources 11 such as light-emitting diodes and a lens 12. The lenses 10 and 12 belong to a type of lens that diffuses and emits light.

Each of the first and second reflection parts 6 and 8 has the gentle slope 63 and the steep slope 64 as shown in FIG. 17C. In the first reflection part 6, the gentle slope 63 is formed so as to face the first incident surface 3a so that light incident from the first light source unit Ph1 is reflected and outputted from the upper surface 2b. In the second reflection part 8, the gentle slope 63 is formed so as to face the second incident surface 4a so that light incident from the second light source ph2 is reflected and outputted from the upper surface 2b.

Figure 2A:
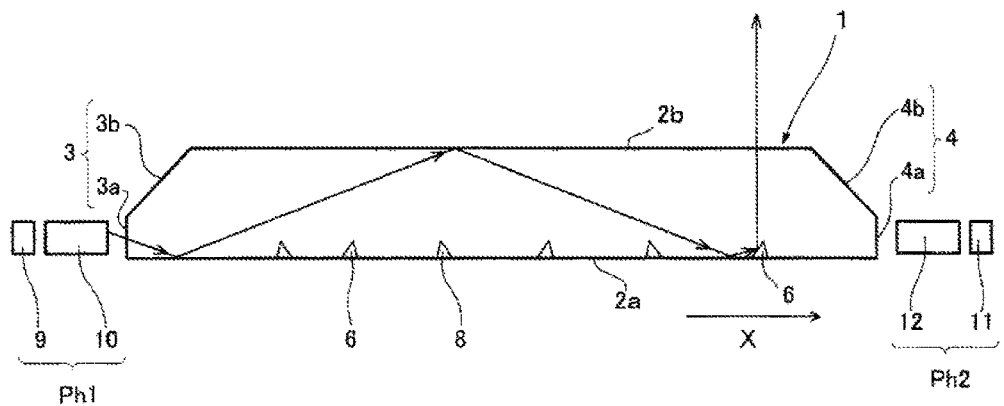
FIGS. 2A and 2B are views for explaining behavior of light in a light guide plate according to the same embodiment.
Figure 2B:
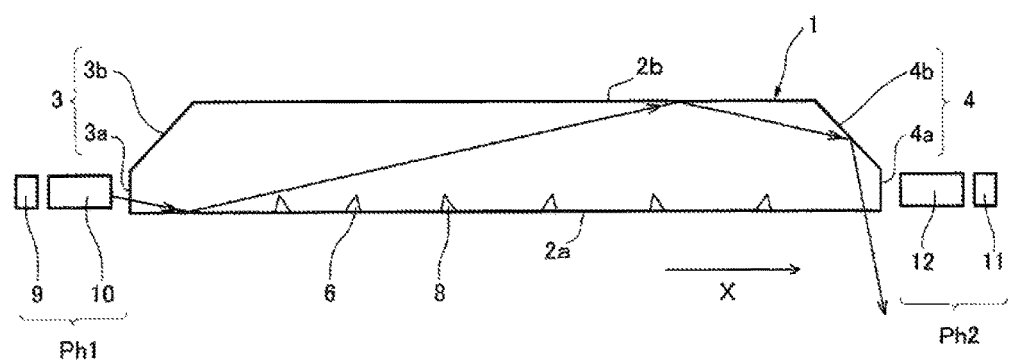

Behavior of light in the display device will be explained with reference to FIGS. 2A and 2B.

As an example, behavior of light obtained when only the first light source unit ph1 is turned on in the first and second light source units Ph1 and Ph2 will be explained in this case.

Light emitted from the first light source unit Ph1 is incident on the light guide plate 1 from the first incident surface 3a of the first side surface 3. The incident light proceeds inside the light guide plate 1 while being totally reflected inside the light guide plate 1 as shown in FIG. 2A. Then, the light is reflected on the first reflection part 6 while propagating inside the light guide plate 1, thereby being outputted from the light guide plate 1. An aggregation of light reflected on the first reflection parts 6 and reflected to an upper part of the light guide plate 1 is displayed as the pattern 5 of "A" as a whole.

There is a component, in the light proceeding inside the light guide plate 1, which reaches the second side surface 4 without being reflected on the first reflection part 6. Light abutting on the second slope 4b of the second side surface 4 as shown in FIG. 2B is reflected and outputted to the outside from the bottom surface 2a of the light guide plate 1. Accordingly, it is possible to reduce a component reflected on the second side surface 4 on the opposite side of the first light source unit Ph1 and returning to and propagating in the inside of the light guide plate 1.

Light incident on the second incident surface 4a from the second light source unit Ph2 proceeds inside the light guide plate 1 while being totally reflected inside the light guide plate 1. When the light is reflected on the second reflection part 8, an aggregation of light reflected to the upper part of the light guide plate 1 is displayed as the pattern 7 of "B" as a whole.

There is a component, in the light proceeding inside the light guide plate 1, which reaches the first side surface 3 without being reflected on the second reflection part 8. Light abutting on the first slope 3b of the first side surface 3 is reflected and outputted to the outside from the bottom surface 2a of the light guide plate 1. Accordingly, it is possible to reduce a component reflected on the first side surface 3 on the opposite side of the second light source unit Ph2 and returning to and propagating in the inside of the light guide plate 1.

Both the first and second slopes 3b and 4b are formed in the entire first and second side surfaces 3 and 4 in the lengthwise direction, however, even when the first and second slopes 3b and 4b are formed in part of the first and second side surfaces 3 and 4 in the lengthwise direction, the effect of suppressing reflected and returned light can be obtained.

The wider regions the first slope 3b and the second slope 4b are, the more unnecessary light returning from side surfaces opposite to incident surfaces can be suppressed. However, when the regions of the first slope 3b and the second slope 4b are too wide, areas of the first incident surface 3a and the second incident surface 4a from which light enters are reduced, therefore, light entrance efficiency is reduced or a phenomenon in which light entering into the light guide plate 1 is blocked by the reflection parts close to the incident surface and is not easily guided in the light guide plate occurs. In order to suppress the above and allow light to propagate inside the light guide plate while suppressing reflected and returned light, it is desirable to satisfy the following formula (1).

When a length of the entire side surface of the light guide plate 1 (a thickness of side surfaces parallel to a normal line of an emission surface) is "T", a length of regions of the first and second slopes 3b and 4b (lengths of slopes in a direction parallel to the normal line of the emission surface) is "t0", a length of the first and second incident surfaces 3a and 4a at so-called portions other than slopes obtained by subtracting "t0" from "T" (a length of portions other than slopes in side surfaces in the direction parallel to the normal line of the emission surface) is "t1", and an average height of the first and second reflection parts 6 and 8 is "h", it is preferable that the following relation is satisfied.

$$T > t1 > h \qquad \text{formula (1)}$$

Figure 3:
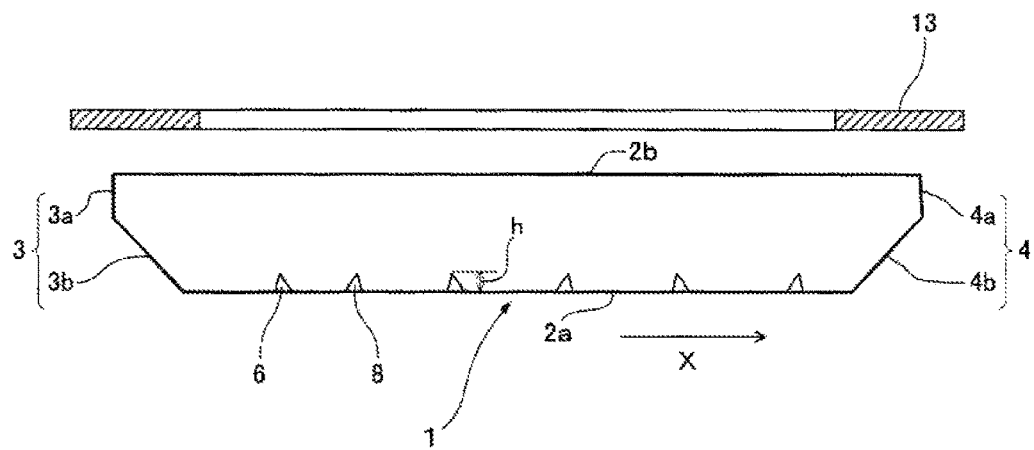
FIG. 3 is a cross-sectional view of a light guide plate of a display device according to Example 2 of the same embodiment.

Though the first and second slopes 3b and 4b are set on the opposite side of the surface where the first and second reflection parts 6 and 8 are formed, the same effects can also be obtained when the first and second slopes 3b and 4b are set on the same side of the surface where the first and second reflection parts 6 and 8 are formed as shown in FIG. 3. In this case, light reflected on the first and second slopes 3b and 4b is outputted from the upper surface 2b of the light guide plate 1, but can be blocked by a light shielding plate 13 provided above the upper surface 2b.

Figure 4:
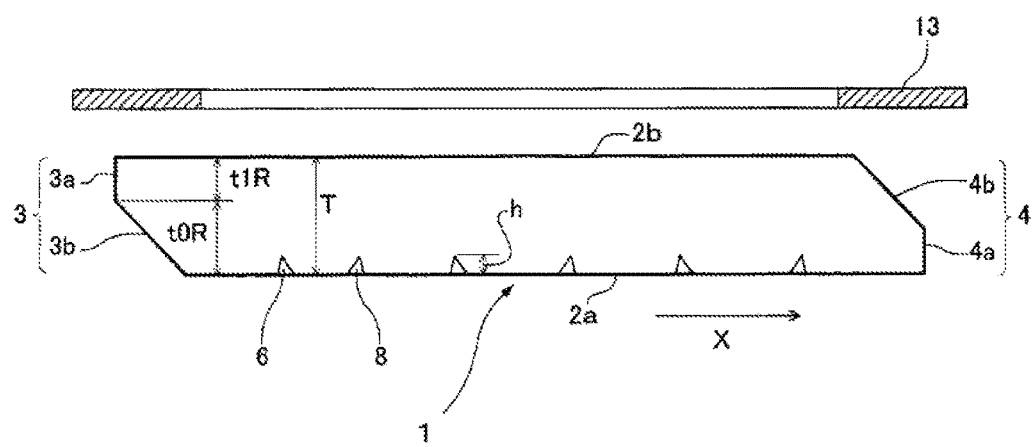
FIG. 4 is a cross-sectional view of a light guide plate of a display device according to Example 3 of the same embodiment.

It is also preferable that positions where slopes are formed are set on the same side and on the opposite side with respect to the surface where the reflection parts are formed as shown in FIG. 4. In the case of FIG. 4, it is preferable to satisfy the following formula (2).

When a length of a region of the first slope 3b positioned on the same side as the surface where the first and second reflection parts 6 and 8 are formed is "t0R", a thickness of the first incident surface 3a obtained by subtracting "t0R" from "the thickness of the light guide plate "T" is "t1R", and an average height of the first reflection parts 6 or the second reflection parts 8 that form patterns to be displayed on the light guide plate 1 is "h", it is desirable that the following relation is satisfied.

$$T > t1R > h \qquad \text{formula (2).}$$

In this case, a length of a region of the second slope 4b is also "t0R".

Furthermore, one first slope 3b is provided in the first side surface 3 and one second slope 4b is provided in the second side surface 4 in the above respective embodiments, however, plural slopes can be provided on one side surface. Specifically, the effect of suppressing reflected and returned light can also be obtained by configurations shown in FIGS. 5A, 5B and 5C.

Figure 5A:
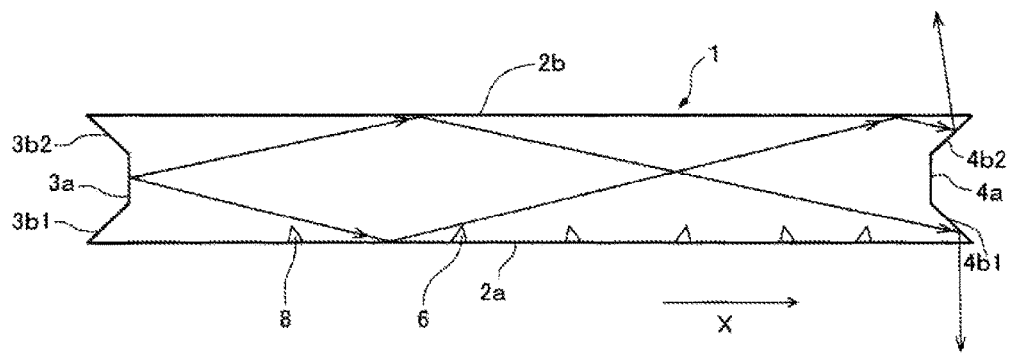
FIGS. 5A, 5B and 5C are cross-sectional views respectively showing different light guide plates of display devices according to Example 4 of the same embodiment.

In FIG. 5A, a slope 3b1 that is inclined from a lower end of the first incident surface 3a in a direction extending to the outside of the light guide plate 1 is formed on the side of the bottom surface 2a of the light guide plate 1 and a slope 3b2 that is inclined from an upper end of the first incident surface 3a in the direction extending to the outside of the light guide plate 1 is formed on the side of the upper surface 2b of the light guide plate 1 with the first incident surface 3a interposed between the slope 3b1 and the slope 3b2 in the first side surface 3. A slope 4b1 that is inclined from a lower end of the second incident surface 4a in a direction extending to the outside of the light guide plate 1 is formed on the side of the bottom surface 2a of the light guide plate 1 and a slope 4b2 that is inclined from an upper end of the second incident surface 4a in the direction extending to the outside of the light guide plate 1 is formed on the side of the upper surface 2b of the light guide plate 1 with the second incident surface 4a interposed between the slope 4b1 and the slope 4b2 in the second side surface 4.

Figure 5B:
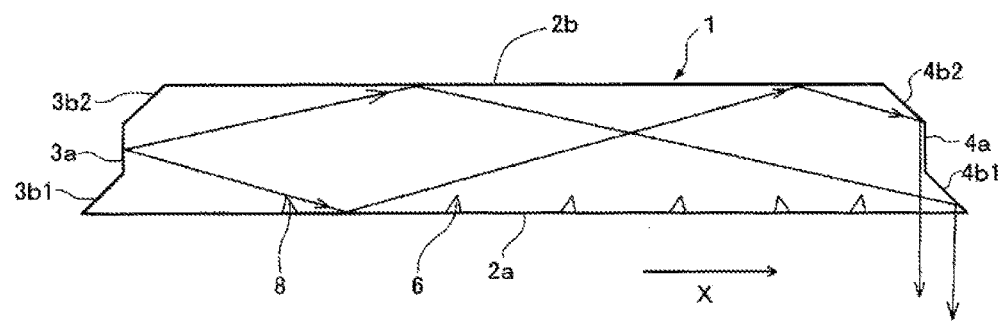

In FIG. 5B, a slope 3b1 that is inclined from a lower end of the first incident surface 3a in the direction extending to the outside of the light guide plate 1 is formed on the side of the bottom surface 2a of the light guide plate 1 and a slope 3b2 that is inclined from an upper end of the first incident surface 3a in a direction extending to the inside of the light guide plate 1 is formed on the side of the upper surface 2b of the light guide plate 1 with the first incident surface 3a interposed between the slope 3b1 and the slope 3b2 in the first side surface 3. A slope 4b1 that is inclined from a lower end of the second incident surface 4a in the direction extending to the outside of the light guide plate 1 is formed on the side of the bottom surface 2a of the light guide plate 1 and a slope 4b2 that is inclined from an upper end of the second incident surface 4a in the direction extending to the inside of the light guide plate 1 is formed on the side of the upper surface 2b of the light guide plate 1 with the second incident surface 4a interposed between the slope 4b1 and the slope 4b2 in the second side surface 4.

Figure 5C:
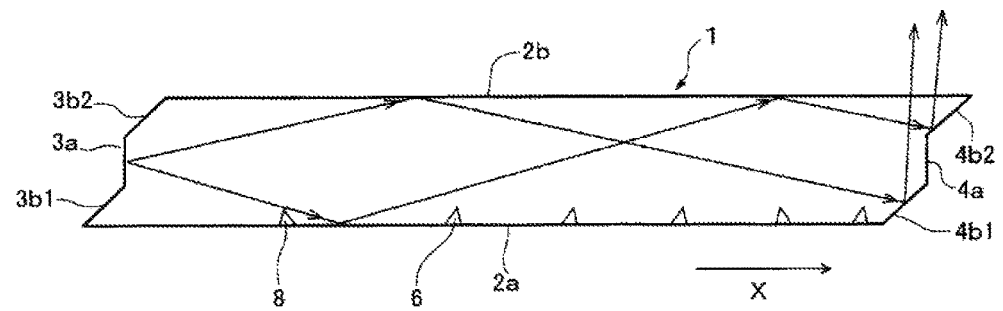

In FIG. 5C, a slope 3b1 that is inclined from a lower end of the first incident surface 3a in the direction extending to the outside of the light guide plate 1 is formed on the side of the bottom surface 2a of the light guide plate 1 and a slope 3b2 that is inclined from an upper end of the first incident surface 3a in the direction extending to the inside of the light guide plate 1 is formed on the side of the upper surface 2b of the light guide plate 1 with the first incident surface 3a interposed between the slope 3b1 and the slope 3b2 in the first side surface 3. A slope 4b1 that is inclined from a lower end of the second incident surface 4a in the direction extending to the inside of the light guide plate 1 is formed on the side of the bottom surface 2a of the light guide plate 1 and a slope 4b2 that is inclined from an upper end of the second incident surface 4a in the direction extending to the outside of the light guide plate 1 is formed on the side of the upper surface 2b of the light guide plate 1 with the second incident surface 4a interposed between the slope 4b1 and the slope 4b2 in the second side surface 4.

In FIGS. 1A and 1B, the light guide plate 1 has the flat shape and the direction of the first and second side surfaces 3 and 4 is orthogonal to the upper surface 2b as the emission surface of the light guide plate 1, however, it is also preferable to adopt a configuration in which the light guide plate 1 has the flat shape and the upper surface 2b of the light guide plate 1 is parallel to the direction of the first and the second side surfaces 3 and 4. Specifically, the shape of the light guide plate 1 is formed to have a configuration shown by, for example, FIG. 6.

Figure 6:
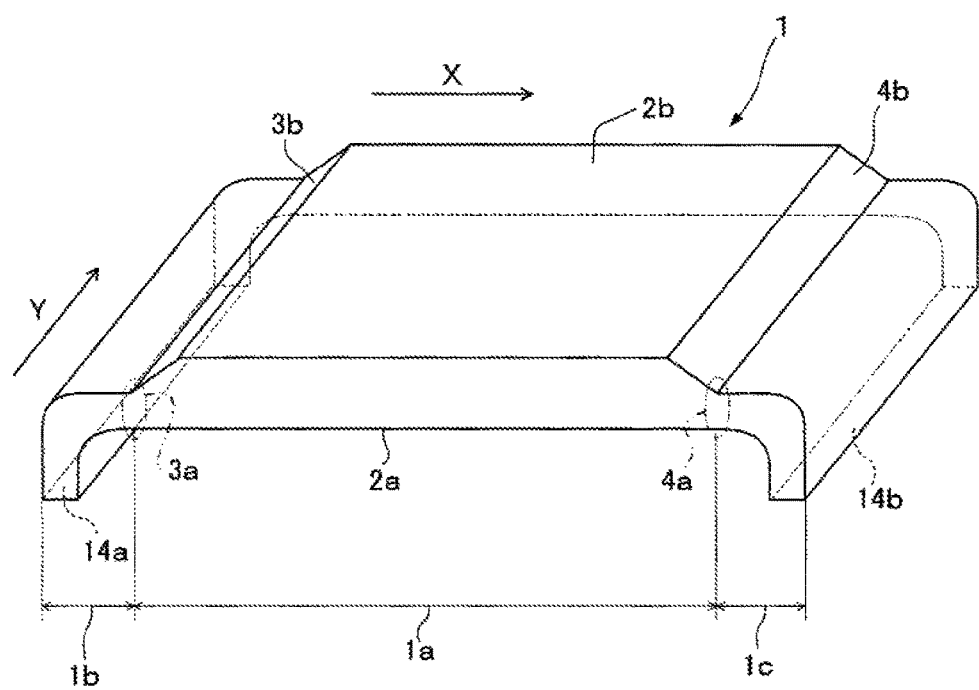
FIG. 6 is a perspective view showing another example of the light guide plate of the display device according to Example 1 of the same embodiment.
Figure 7:
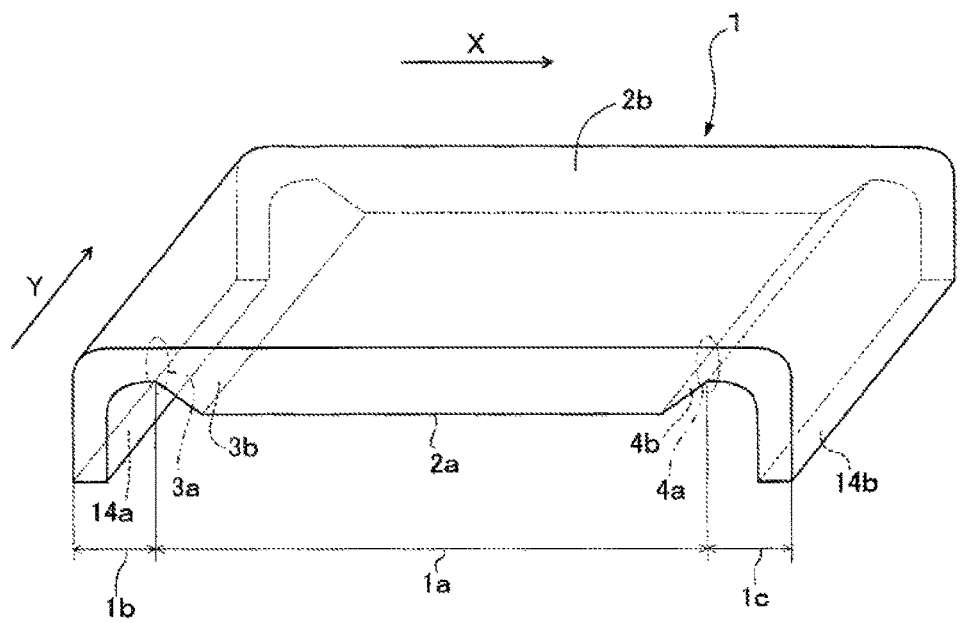
FIG. 7 is a perspective view showing further another example of the light guide plate of the display device according to Example 2 of the same embodiment.
Figure 8:
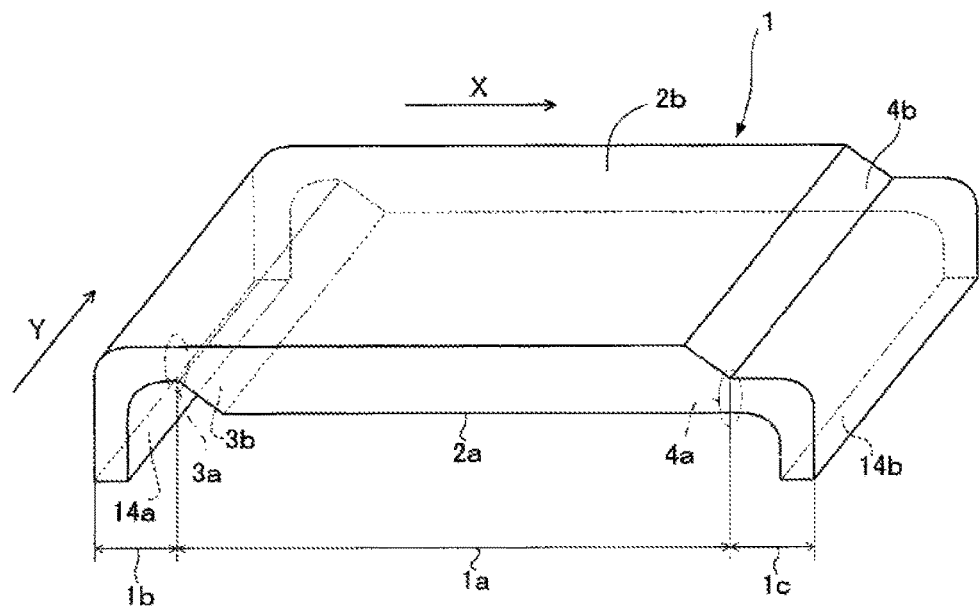
FIG. 8 is a perspective view showing further another example of the light guide plate of the display device according to Example 3 of the same embodiment.
Figure 9:
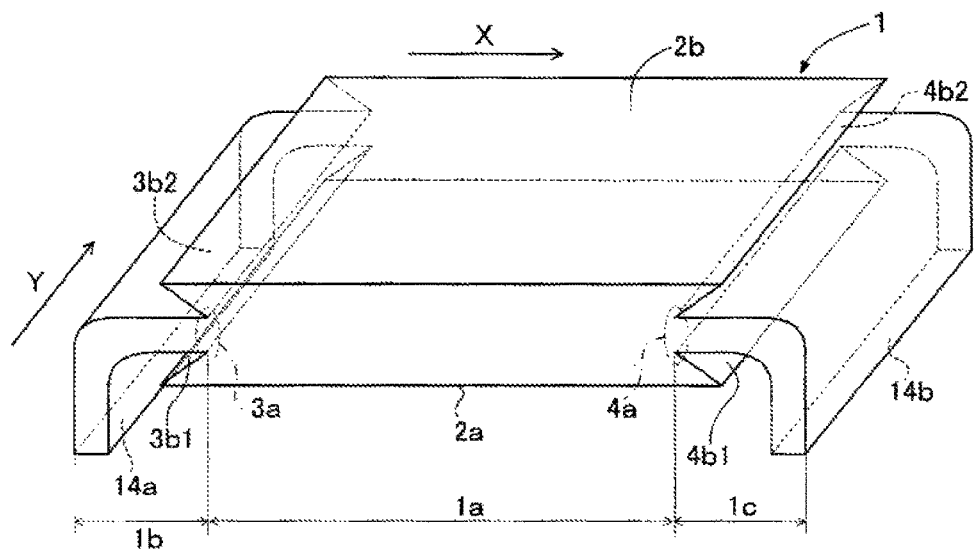
FIG. 9 is a perspective view showing another example of the light guide plate of the display device according to FIG. 5A of the same embodiment.
Figure 10:
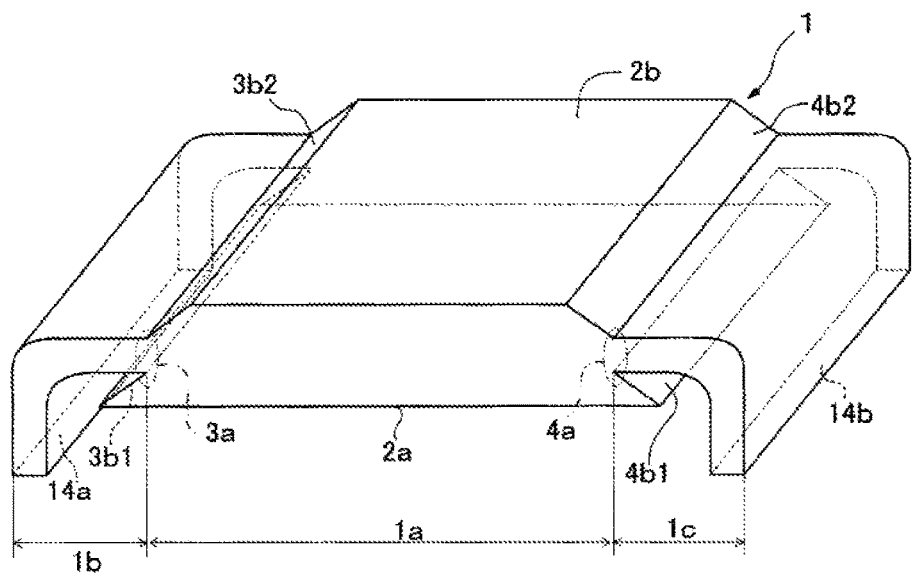
FIG. 10 is a perspective view showing further another example of the light guide plate of the display device according to FIG. 5B of the same embodiment.
Figure 11:
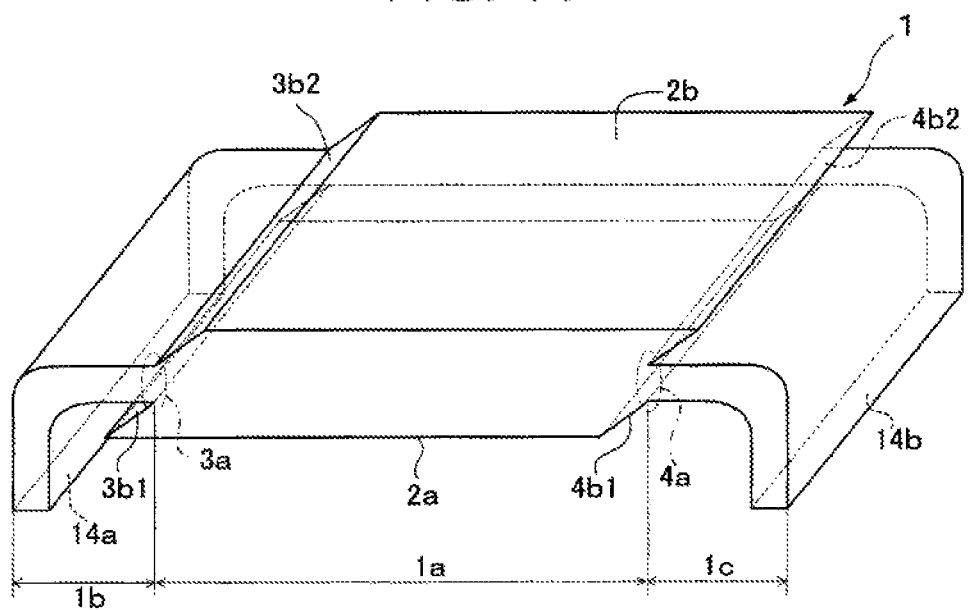
FIG. 11 is a perspective view showing further another example of the light guide plate of the display device according to FIG. 5C of the same embodiment.

In the light guide plate 1 shown in FIG. 6, light introducing paths 1b and 1c having a curved surface shape are integrally formed in part of a flat light guide plate body 1a in which the first and second reflection parts 6 and 8 are formed on the bottom surface 2a. Light is incident on the light guide plate body 1a from end surfaces 14a and 14b of the light introducing paths 1b and 1c through the light introducing paths 1b and 1c. Directions of the first and second incident surfaces 3a and 4a can be changed so as to be parallel to the direction of the upper surface 2b of the light guide plate body 1a by the light introducing paths 1b and 1c, and light is allowed to enter from below or above which is the normal line direction of the upper surface 2b of the light guide plate 1.

In this case, the light introducing paths 1b and 1c are provided to change the directions of the first and second incident surfaces 3a and 4a to be parallel to the direction of the upper surface 2b of the light guide plate body 1a. However, it is also preferable that only one of the light introducing path 1b and the light introduction part 1c is provided in the light guide plate body 1a.

The same applies to examples of FIG. 3, FIG. 4, FIGS. 5A, 5B and 5C. As shown in FIG. 7, FIG. 8, FIG. 9, FIG. 10 and FIG. 11, the light introducing paths 1b and 1c are integrally molded at least in part of the light guide plate body 1a, thereby forming the upper surface 2b of the light guide plate 1 to be parallel to the directions of the first and second side surfaces 3 and 4.

In the example shown in FIGS. 1A and 1B, the first slope 3b is formed in the entire first side surface 2 in the lengthwise direction and the second slope 4b is formed in the entire second side surface 4 in the lengthwise direction, however, the effect of suppressing at least part of the reflected and returned light can be obtained by providing only the first slope 3b or the second slope 4b. Moreover, the effect of suppressing at least part of the reflected and returned light can be also obtained by providing the first and second slopes 3b and 4b only in part of the first and second side surfaces 3 and in the lengthwise direction. Furthermore, the effect of suppressing only part of the reflected and returned light can also be achieved in the case where the first slope 3b is provided in part of the first side surface 3 in the lengthwise direction and the second slope 4b is not provided in the second side surface 4, and in the case where the second slope 4b is provided in part of the second side surface 4 in the lengthwise direction and the first slope 3b is not provided in the first side surface. The same applies to other examples of Embodiment 1.

The cases of the first and second side surfaces 3 and 4 in the short-length direction in facing side surfaces of the light guide plate 1 have been explained, however, the same applies to a case where incidental light is allowed from side surfaces in the longitudinal direction in facing side surfaces of the light guide plate 1 shown in FIGS. 1A and 1B and the first and second reflection parts 6 and 8 are provided so as to display the patterns 5 or 7.

Embodiment 2

Figure 12:
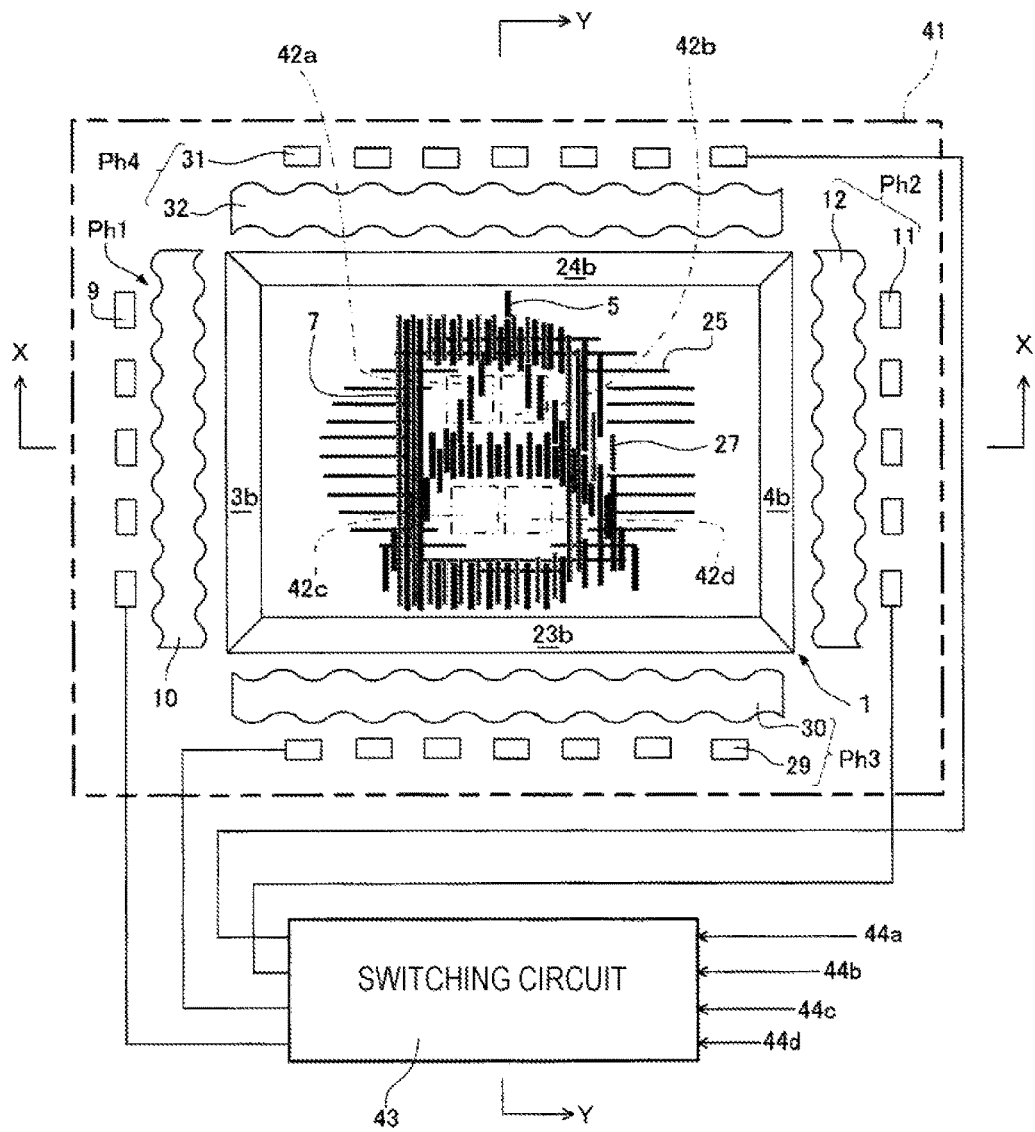
FIG. 12 is a plan view showing a display device according to Embodiment 2 of the present disclosure.
Figure 13A:
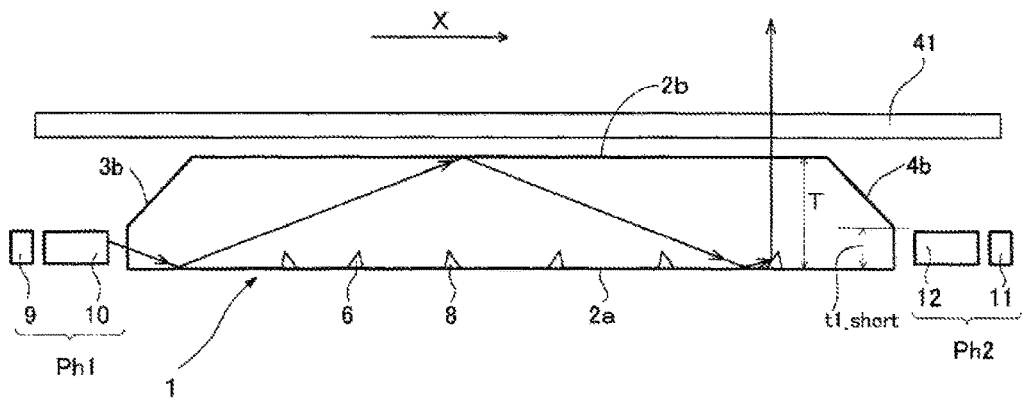
FIG. 13A is a cross-sectional view taken along X-X and FIG. 13B is a cross-sectional view taken along Y-Y of the display device according to Embodiment 2 of the present disclosure.
Figure 13B:
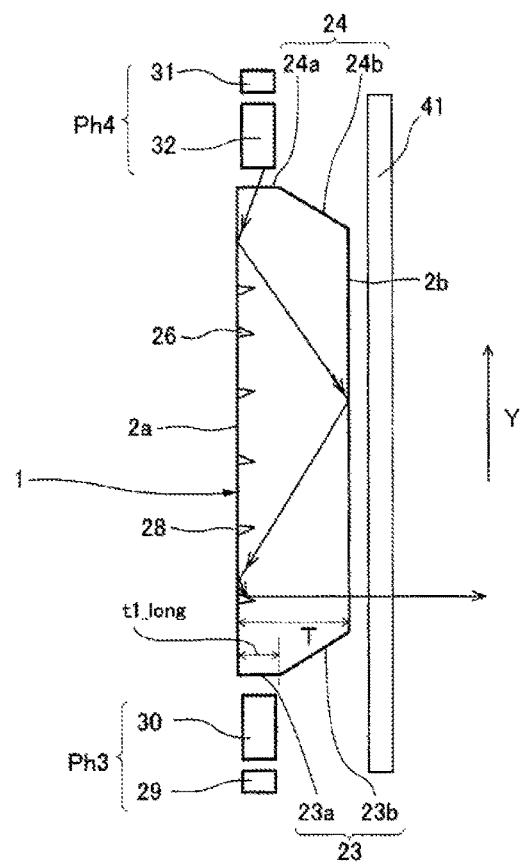

FIG. 12, FIGS. 13A and 13B show Embodiment 2 of the present disclosure.

FIG. 12 shows a front view of a display device according to Embodiment 2 of the present disclosure, FIG. 13A shows a cross-sectional view taken along X-X of FIG. 12 and FIG. 13B shows a cross-sectional view taken along Y-Y of FIG. 12. In Embodiment 1, light is selectively incident on the first and second side surfaces 3 and 4 of the light guide plate 1 which face each other to thereby display the pattern 5 of "A" or the pattern 7 of "B" while switching between these patterns. In Embodiment 2, display is performed while not only switching between "A" and "B" but also switching between a pattern of "C" and a pattern of "D" by allowing light to be selectively incident on third and fourth side surfaces 23 and 24 of the light guide plate 1 which face each other.

The first and second side surfaces 3 and 4, the first and second reflection parts 6 and 8, and the first and the second light source units Ph1 and Ph2 in the light guide plate 1 are the same as those of FIGS. 1A and 1B.

A third light source unit Ph3 is formed by light sources 29 such as light-emitting diodes and a lens 30. A fourth light source unit ph4 is formed by light sources 31 such as light-emitting diodes and a lens 32. The lenses 30 and 32 belong to a type of lens that diffuses and emits light.

In a third side surface 23 and a fourth side surface 24 which face each other in an outer peripheral surface between the bottom surface 2a and the upper surface 2b of the flat light guide plate 1, the third side surface 23 includes a third incident surface 23a a lower end of which is connected to an outer periphery of the bottom surface 2a and which vertically rises and a third slope 23b which is positioned between an outer periphery of the upper surface 2b of the light guide plate 1 and an upper end of the third incident surface 23a and which is inclined toward the inside of the light guide plate 1. The third slope 23b is formed in the entire third side surface 23 in a lengthwise direction (X-direction).

The fourth side surface 24 includes a fourth incident surface 24a a lower end of which is connected to the outer periphery of the bottom surface 2a and which vertically rises and a fourth slope 24b which is positioned between the outer periphery of the upper surface 2b of the light guide plate 1 and an upper end of the fourth incident surface 24a and which is inclined toward the inside of the light guide plate 1 in the same manner as the third side surface 23. The fourth slope 24b is formed on the entire fourth side surface 24 in a lengthwise direction (X-direction).

On the bottom surface 2a of the light guide plate 1, third and fourth reflection parts 26 and 28 are formed. The third reflection parts 26 are formed so as to display a pattern 25 of "C" by light incident on the third incident surface 23a from the third light source unit Ph3. The fourth reflection parts 28 are formed so as to display a pattern 27 of "D" by light incident on the fourth incident surface 24a from the fourth light source unit Ph4.

A translucent plate 41 with a switch function such as a capacitance sensor is installed above the light guide plate 1. The translucent plate 41 in the specification is formed of a sheet or a board. The translucent plate 41 is shown by virtual lines in FIG. 12. In FIGS. 13A and 13B, the translucent plate 41 is shown by solid lines. The translucent plate 41 is a half mirror with a transmittance of approximately 1 to 70% or a light transmitting plate which is colored black or the like, which is shown by operation areas 42a, 42b, 42c and 42d of the switch function in FIG. 12.

A switching circuit 43 detects a detection signal 44a indicating that the operation area 42a has been operated and turns on the first light sources 9 as well as turns off the second, third and fourth light sources 11, 29 and 31. The switching circuit 43 detects a detection signal 44b indicating that the operation area 42b has been operated and turns on the second light sources 11 as well as turns off the first, third and fourth light sources 9, 29 and 31. The switching circuit 43 detects a detection signal 44c indicating that the operation area 42c has been operated and turns on the third light sources 29 as well as turns off the first, second and fourth light sources 9, 11 and 31. The switching circuit 43 detects a detection signal 44d indicating that the operation area 42d has been operated and turns on the fourth light sources 31 as well as turns off the first, second and third light sources 9, 11 and 29.

As the third and fourth slopes 23b and 24b are formed in the light guide plate 1 as described above, the effect of suppressing reflected and returned light can be obtained in the same manner as in the case of the first and second slopes 3b and 4b.

Due to the presence of the translucent plate 41, when any of the first, second, third and fourth light sources 9, 11, 29 and 31 are not turned on, light from the outside in the periphery of the light guide plate is reflected on the translucent plate 41, therefore, the presence of the light guide plate 1 can be hidden.

A length in an X-X direction is longer than a length in a Y-Y direction in the light guide plate 1. In this case, there are optimum conditions in regions of the first and second slopes 3b and 4b in the longitudinal direction (X-direction) of the light guide plate 1 and in regions of the third and fourth slopes 23b and 24b in a short-length direction (Y-direction) due to the following points.

When any of the operation areas 42a, 42b, 42c and 42d are pressed, the translucent plate 41 is deformed and the light guide plate 1 is pressed and deformed through the translucent plate 41. Deformation of the light guide plate 1 is increased relatively in the longitudinal direction. Deformation due to distortion occurring at the time of molding the light guide plate 1 is generally increased in the longitudinal direction rather than in the short-length direction. According to the above, it is preferable in the light guide plate 1 that mechanical strength is higher in the longitudinal direction. Therefore, it is desirable to satisfy the following formula (3).

As shown in FIGS. 13A and 13B, concerning t1_short obtained by subtracting a height "t0" of the first and second slopes 3b and 4b from a thickness "T" of the light guide plate 1 and t1_long obtained by subtracting a height "t0" of the third and fourth slopes 23b and 24b from the thickness "T" of the light guide plate 1, $$t1\_short < t1\_long \qquad \text{formula (3) holds.}$$

According to the above setting, the mechanical strength of the light guide plate 1 in the longitudinal direction can be increased and deformation can be suppressed. Therefore, a phenomenon in which outgoing light at a portion parallel to a short side in the center of a long side is reduced or a phenomenon in which outgoing light at portions parallel to the short side in both end portions of the long side is reduced can be suppressed.

In the explanation of Embodiment 2, the modifications of FIGS. 1A and 1B to Embodiment 1 has been explained as an example. However, the same applies to cases of FIG. 3, FIG. 4, FIGS. 5A, 5B and 5C and FIG. 6 to FIG. 11 as well.

The first, second, third and fourth slopes 3b, 4b, 23b and 24b are provided over the entire side surfaces of the light guide plate 1 in the lengthwise direction, however, the effect of suppressing reflected and returned light can be obtained even when the slopes are provided at part of the side surfaces.

Moreover, the plate with the switch function can be used as the translucent plate 41. Formula (3) should be satisfied whether the translucent plate 41 has a switch function or not due to the degree of deformation occurring at the time of molding the light guide plate.

Embodiment 3

Figure 15A:
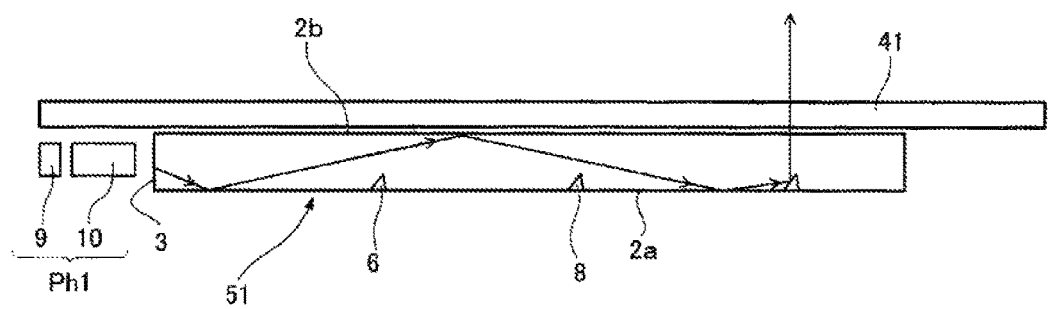
FIG. 15A is a cross-sectional view taken along X-X and FIG. 15B is a cross-sectional view taken along Y-Y of the display device according to Embodiment 3 of the present disclosure.
Figure 15B:
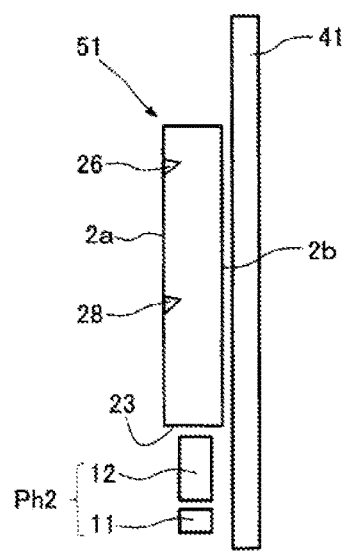

FIG. 14 shows a front view of a display device according to Embodiment 3 of the present disclosure, FIG. 15A shows a cross-sectional view taken along X-X of FIG. 14 and FIG. 15B shows a cross-sectional view taken along Y-Y of FIG. 14.

The light guide plate 1 including the first side surface 3 and the second side surface 4 facing each other is used in Embodiment 1. In a light guide plate 51 according to Embodiment 3, light is incident on the first side surface 3 from the first light source unit Ph1 and light is incident on the third side surface 23 adjacent to the first side surface 3 from the second light source unit Ph2. The first side surface 3 and the third side surface 23 of the light guide plate 1 are orthogonal to each other.

The first light source unit Ph1 is formed by light sources 9, such as light-emitting diodes, and a lens 10. The second light source unit Ph2 is formed by light sources 11, such as light-emitting diodes, and a lens 12. The lenses 10 and 12 belong to a type of lens that diffuses and emits light.

On a bottom surface 2a of the light guide plate 51, a large number of first reflection parts 6 are engraved as protruding parts protruding to the inside so that the pattern 5 of "A" is displayed as a whole seen from the upper surface 2b. Furthermore, a large number of second reflection parts 8 are engraved as protruding parts protruding to the inside in the same display range as the display range of the pattern 5 so that the pattern 25 of "C" is displayed as a whole seen from the upper surface 2b.

The translucent plate 41 with the switch function such as a capacitance sensor is installed above the upper surface of the light guide plate 51. The translucent plate 41 is a half mirror with a transmittance of approximately 1 to 70% or alight transmitting plate which is colored black or the like.

Due to the presence of the translucent plate 41, when any of the first and second light source units Ph1 and Ph2 are not turned on, light from the outside of the light guide plate is reflected on the translucent plate 41, therefore, the presence of the light guide plate 1 can be hidden. When any of the first and second light source units Ph1 and Ph2 are turned on, any of the patterns 5 and 25 corresponding to the light source is displayed through the translucent plate 41. The display device can be used as a switch for switching patterns by the combination of the switching circuit 43 and the translucent plate 41 explained in Embodiment 2.

Figure 16:
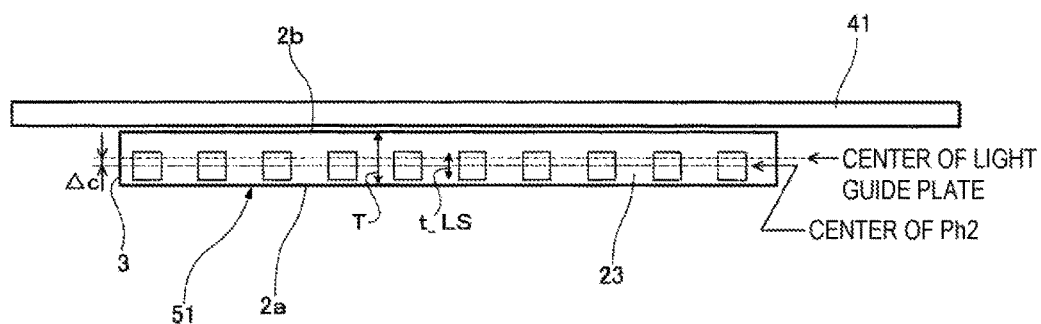
FIG. 16 is a view for explaining optimum conditions of a light guide plate according to the same embodiment.
Figure 20A:
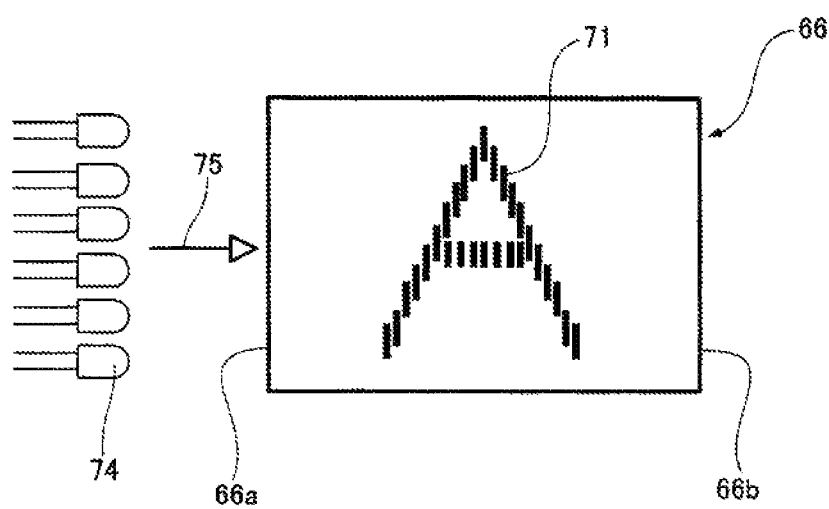
FIG. 20A is a view for explaining the related-art example during display of the pattern "A" in the display area.
Figure 20B:
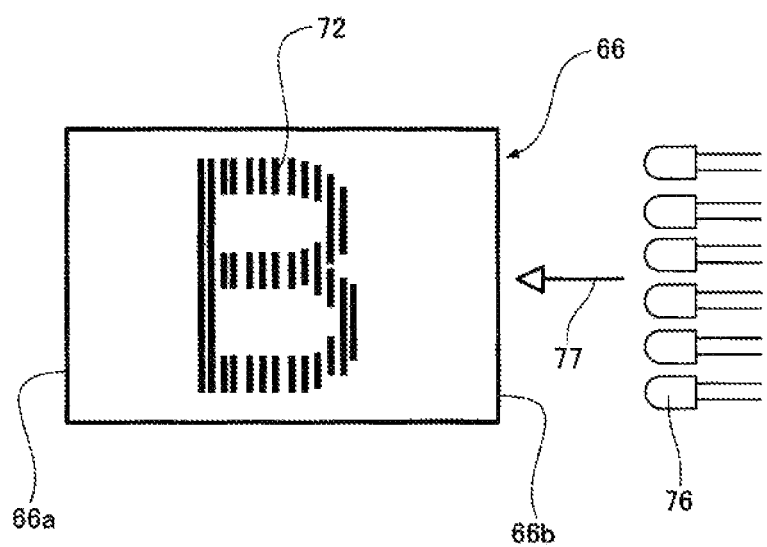
FIG. 20B is a view for explaining the related-art example during display of the pattern "B" on the same display area.
Figure 21A:
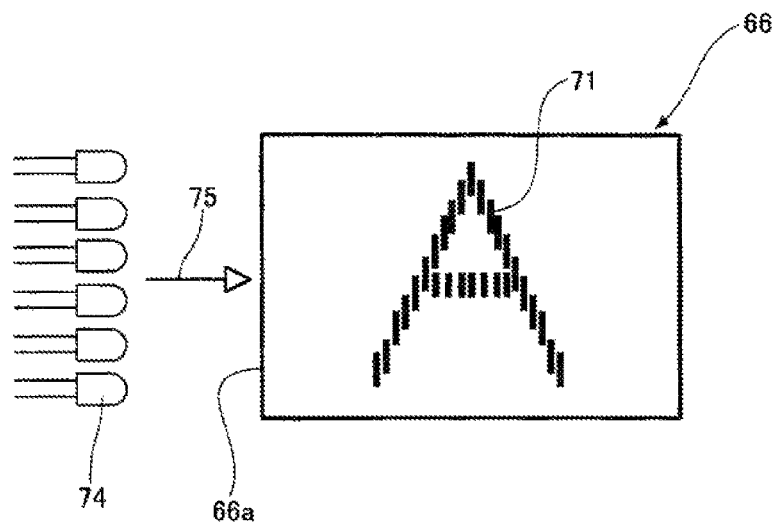
FIGS. 21A and 21B are views showing another related-art light guide plate.
Figure 21B:
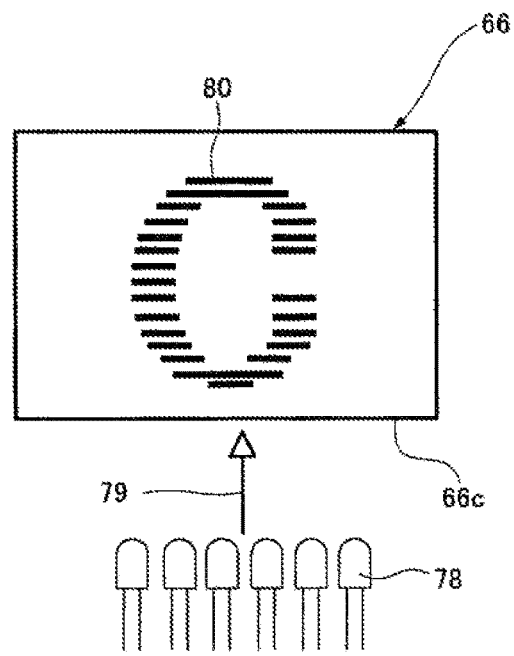
Figure 22:
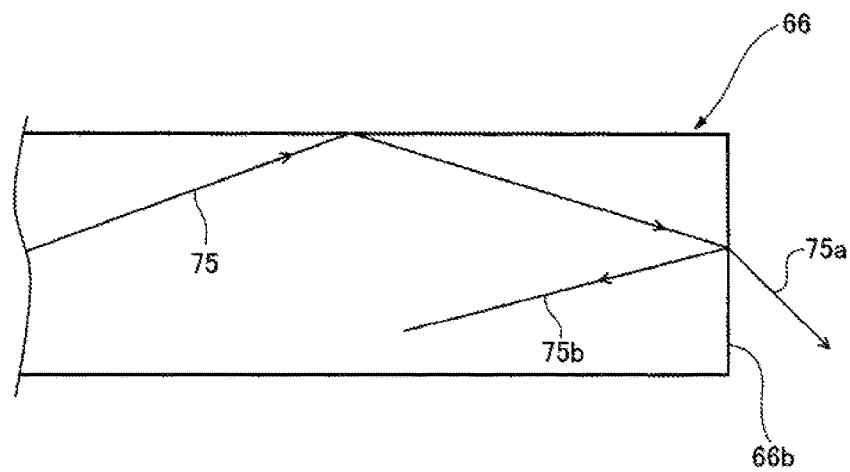
FIG. 22 is a cross-sectional view showing a reflection state of light at an end surface of the light guide plate explained in FIGS. 20A and 20B.
Figure 23:
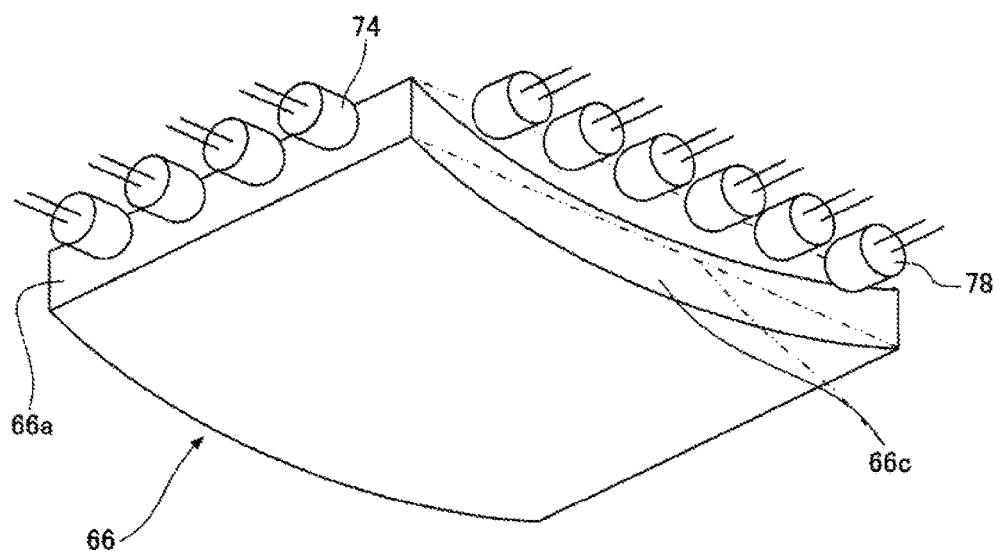
FIG. 23 is a view showing a deformed state of the light guide plate explained in FIGS. 21A and 21B.

FIG. 16 is a view showing the third side surface 23 of FIG. 14 seen from a viewpoint A (arrow), which is the view for explaining suitable conditions for a thickness of the light guide plate 51 and sizes and positions of light sources. Assume that a length in a cross section X-X is longer than a length of a cross section Y-Y in the light guide plate 51.

When assuming that the translucent plate 41 is pressed as a switch, deformation in the longitudinal direction is relatively increased. Deformation due to distortion occurring at the time of molding the light guide plate 51 is generally greater in the longitudinal direction than in the short-length direction. According to the above, it is highly likely that positional deviation occurs between the second light source unit Ph2 and a light entrance part of the light guide plate 51 in a side in the longitudinal direction of the light guide plate 51. When considering this, it is desirable to satisfy the following formula (4).

When a thickness of the light guide plate is "T", a dimension of the second light source unit Ph2 in a thickness direction is "t_LS" and a deviation amount between a center of the light guide plate and a center of the second light source unit Ph2 is $\Delta c$, the following formula is satisfied:

$$T > t\_LS \Delta c \qquad \text{formula (4)}$$

When the above formula is satisfied, even in the case where the translucent plate 41 is pressed/operated and the light guide plate 51 is deformed in the longitudinal direction, it is possible to partially suppress reduction in efficiency of light entering the light guide plate 51 from the second light source unit Ph2, therefore, a phenomenon in which outgoing light at a portion parallel to a short side in the center of a long side is reduced or a phenomenon in which outgoing light at portions parallel to the short side in both end portions of the long side is reduced can be suppressed.

When considering that the light guide plate 51 is pressed in a normal line direction of the light emitting surface, it is desirable that the center of the second light source unit Ph2 is deviated in a direction of the bottom surface 2a which is the opposite direction of the upper surface 2b as the emission surface where the translucent plate 41 exists with respect to the center of the light guide plate 51.

In Embodiment 3, the light guide plate 51 is formed in the flat plate and light enters from the first light source unit Ph1 facing the first side surface 3, however, it is preferable that light introducing path 1b having the curved surface shape as shown in FIG. 6 of Embodiment 1 is integrally formed in the light guide plate 51, and a portion from which light is allowed to enter the light guide plate 51, is folded to allow light to enter from above or from below.

Though the plate with the switch function is used as the translucent plate 41, it is also desirable to satisfy formula (4) in the case of a translucent plate not having the switch function.

Embodiment 4

In a case where the light guide plate 1 according to Embodiment 2 shown in FIG. 12 has a rectangular shape elongated in the X-X direction in cross section and light is directly incident on the third incident surface 23a of the third side surface 23 of the light guide plate 1 from the third light source unit Ph3 not through the light introducing path having the curved surface shape such as the light introducing path 1b having the curved surface shape as shown in FIG. 6 and the like, and in a case where light is directly incident on the fourth incident surface 24a of the fourth side surface 24 of the light guide plate 1 from the fourth light source unit Ph4, it is highly likely that positional deviation occurs between the third light source unit Ph3 and the third side surface 23 of the light guide plate 1 and positional deviation occurs between the fourth light source unit Ph4 and the fourth side surface 23 of the light guide plate 1 insides of longitudinal direction. When considering the above, satisfying formula (4) will produce an extremely effective configuration in Embodiment 3.

The present disclosure contributes to improvement of display quality of display devices incorporated in game machines such as a pachinko machine or a pachinko slot machine or other various apparatuses and display devices used alone.

What is claimed is:

1. A display device comprising:
    a light guide plate having a first side surface and a second side surface facing each other, a bottom surface and an upper surface facing each other are formed between the first side surface and the second side surface, and light incident on the inside from one of the first side surface and the second side surface propagates toward the other of the first side surface and the second side surface;
    a first light source unit allowing light to be incident on the first side surface of the light guide plate; and
    a second light source unit allowing light to be incident on the second side surface of the light guide plate, in which light incident on the first side surface of the light guide plate from the first light source unit is reflected to an upper surface side by first reflection parts formed on the bottom surface of the light guide plate and is emitted to the outside of the light guide plate to thereby display a first pattern, and light incident on the second side surface of the light guide plate from the second light source unit is reflected to the upper surface side by second reflection parts formed on the bottom surface of the light guide plate and is emitted to the outside of the light guide plate to thereby display a second pattern, wherein a first slope of the first side surface and a second slope of the second side surface are set in the same position in a thickness direction of the light guide plate, and wherein, when a thickness of the light guide plate is "T", a distance between the first slope and the second slope in the thickness direction is "t0", a thickness obtained by subtracting the distance between the first slope and the second slope in the thickness direction "t0" from the thickness of the light guide plate "T" is "t1", and an average height of the first and second reflection parts is "h", a relationship T>t1>h is satisfied.

2. The display device according to claim 1,
wherein the first slope provided at part of the first side surface and the second slope provided at part of the second side surface of the light guide plate are provided on a bottom surface side and on an upper surface side.

3. The display device according to claim 1,
wherein a light introducing path having a curved surface part is connected to at least one of the first side surface and the second surface of the light guide plate, and light is incident on the first side surface or the second side surface through the light introducing path.

4. The display device according to claim 1,
wherein a translucent plate having light transmittance is installed on the upper surface side of the light guide plate.

5. The display device according to claim 4,
wherein the translucent plate has a touch-sensor function.

6. The display device according to claim 4,
wherein the translucent plate has a switch function.

7. A display device comprising:
a light guide plate having a first side surface and a second side surface facing each other, a bottom surface and an upper surface facing each other are formed between the first side surface and the second side surface, and light incident on the inside from one of the first side surface and the second side surface propagates toward the other of the first side surface and the second side surface;
a first light source unit allowing light to be incident on the first side surface of the light guide plate; and
a second light source unit allowing light to be incident on the second side surface of the light guide plate, in which light incident on the first side surface of the light guide plate from the first light source unit is reflected to an upper surface side by first reflection parts formed on the bottom surface of the light guide plate and is emitted to the outside of the light guide plate to thereby display a first pattern, and light incident on the second side surface of the light guide plate from the second light source unit is reflected to the upper surface side by second reflection parts formed on the bottom surface of the light guide plate and is emitted to the outside of the light guide plate to thereby display a second pattern, wherein a first slope of the first side surface and a second slope of the second side surface are set in different positions in a thickness direction, wherein the first slope of the first side surface is formed on a bottom surface side of the light guide plate,
the second slope of the second side surface is formed on an upper surface side of the light guide plate, and
wherein, when a length of the first slope and the second slope in the thickness direction of the light guide plate is "t0R", a thickness obtained by subtracting the distance of the first slope and the second slope in the thickness direction "t0R" from the thickness "T" of the light guide plate "T" is "t1R", and an average height of the first and second reflection parts is "h", a relationship T>t1R>h is satisfied.

8. A display device comprising:
a light guide plate having a first side surface and a second side surface adjacent to the first side surface, the first side surface and the second side surface being orthogonal to each other, a bottom surface and an upper surface facing each other and being formed so as to form the first side surface and the second side surface such that light incident on the inside from the first side surface and the second side surface propagates;
a first light source unit allowing light to be incident on the first side surface in a short-length direction in the first side surface and the second side surface; and
a second light source unit allowing light to be incident on the second side surface in a longitudinal direction in the first side surface and the second side surface, in which light incident on the first side surface of the light guide plate from the first light source unit is reflected to an upper surface side by first reflection parts formed on the bottom surface of the light guide plate and is emitted to the outside of the light guide plate to thereby display a first pattern, and light incident on the second side surface of the light guide plate from the second light source unit is reflected to the upper surface side by second reflection parts formed on the bottom surface of the light guide plate and is emitted to the outside of the light guide plate to thereby display a second pattern, wherein, when a thickness of the second side surface of the light guide plate is "T", a length of the second light source unit in a thickness direction of the light guide plate is "t_LS", and a distance between a center of the thickness of the second side surface of the light guide plate and a center of the length of the second light source unit in the thickness direction of the light guide plate is $\Delta C$, a relationship T>t_LS>$\Delta C$ is satisfied.

9. The display device according to claim 8,
wherein a center of the second light source unit is deviated from a center of the length in the thickness direction of the light guide plate by a distance $\Delta C$ in the opposite direction of an emission surface of the light guide plate.

10. The display device according to claim 8,
wherein light from the first light source is allowed to enter the inside of the light guide plate from at least the first side surface of the light guide plate through a light introducing path having a curved surface part.

11. The display device according to claim 8,
wherein a translucent plate having light transmittance is installed on the upper surface side of the light guide plate.

12. The display device according to claim 11,
wherein the translucent plate has a switch function.

13. The display device according to claim 8,
wherein the translucent plate has a touch-sensor function.

* * * * *